United States Patent Office 3,523,831
Patented Aug. 11, 1970

3,523,831
STORAGE BATTERY WITH NICOTINIC ACID AMIDE ADDITIVE
Hiroshi Nozaki, Tokyo, Japan, assignor to Kabushiki Kaisha Noza Kagaku, Tokyo, Japan
No Drawing. Filed Jan. 26, 1968, Ser. No. 700,715
Claims priority, application Japan, Feb. 2, 1967, 42/6,321
Int. Cl. H01m 39/04
U.S. Cl. 136—154     3 Claims

ABSTRACT OF THE DISCLOSURE

An electrolyte of a storage battery containing less than 10 g. per liter of nicotinic acid amide.

DESCRIPTION OF THE INVENTION

This invention relates to a storage battery such as a lead acid storage battery, an alkaline storage battery, a neutral storage battery or the like, and a principal object of the invention is to provide a storage battery, as above, which has improved performance characteristics.

According to this invention there is provided a storage battery containing an electrolyte with an additive consisting essentially of nicotinic acid amide.

It is desirable in a storage battery to lessen the development of gas at the time of charging, and it is desirable for this purpose to increase the hydrogen overvoltage.

The inventor, as a result of many years research, has found that by adding nicotinic acid amide to the electrolyte, the above purposes can be achieved, while additional desirable effects are obtained. The nicotinic acid amide adheres closely to the cathode electrode surface so as to restrict the development of hydrogen and prevent self-discharge and, at the same time, it increases the cathode reaction efficiency. Additionally, this compound has the characteristic feature that it is stable in the electrolyte and does not affect the electrical conduction, while also it does not interfere with charging and discharging, even though intimately adhered to the electrodes. Nicotinic acid amide provides particularly good results in crystal production at both electrodes during charging and discharging in a lead acid storage battery. In particular, nicotinic acid amide, due to its permeability, permeates into fine pores in the electrodes so as to develop the crystals into three-dimensional form and improve the battery reaction. Additionally, nicotinic acid amide serves to lower the bath resistance of the electrolyte.

The amount of the additive used in this invention is less than 10 g. per liter of the electrolyte.

This invention will next be described in greater detail with reference to the following example.

EXAMPLE

A storage battery is prepared with a sulfuric acid electrolyte and to the electrolyte there is added nicotinic acid amide in the amount of 1 g. per liter of electrolyte. The amount of hydrogen gas developed after 520 minutes of charging is 17.6%, whereas the hydrogen gas developed without the additive is 19.9%. Thus, the hydrogen gas production is remarkably decreased by the addition of nicotinic acid amide.

The same effect as above is obtained when the additive is used in an alkaline storage battery and a neutral storage battery.

Thus, according to the present invention, a storage battery having improved performance can be easily obtained by adding nicotinic acid amide compound to the electrolyte thereof.

It will now become apparent to those skilled in the art numerous modifications and variations can be made in the disclosed embodiments without departing from the scope and spirit of the invention.

What is claimed is:
1. A storage battery containing an electrolyte and an additive consisting essentially of nicotinic acid amide.
2. A battery as claimed in claim 1, wherein the amount of additive is less than 10 grams per liter of electrolyte.
3. A battery as claimed in claim 1, wherein said nicotinic acid amide is added in an amount of 1 gram per liter of electrolyte.

References Cited

UNITED STATES PATENTS

| | | | |
|---|---|---|---|
| 1,684,852 | 9/1928 | Werby | 136—154 |
| 2,874,204 | 2/1959 | Morehouse et al. | 136—137 XR |

WINSTON A. DOUGLAS, Primary Examiner

D. L. WALTON, Assistant Examiner

U.S. Cl. X.R.
204—53